(12) United States Patent
Lathrop et al.

(10) Patent No.: US 11,144,221 B1
(45) Date of Patent: Oct. 12, 2021

(54) EFFICIENT RESILIENCE IN A METADATA PAGING ARRAY FOR IN-FLIGHT USER DATA

(71) Applicant: EMC IP HOLDING COMPANY LLC, Hopkinton, MA (US)

(72) Inventors: Stephen M Lathrop, Milford, MA (US); Jeremy O'Hare, Westborough, MA (US); Anoop Raghunathan, Ashland, MA (US)

(73) Assignee: Dell Products L.P., Hopkinton, MA (US)

( * ) Notice: Subject to any disclaimer, the term of this patent is extended or adjusted under 35 U.S.C. 154(b) by 8 days.

(21) Appl. No.: 16/845,130

(22) Filed: Apr. 10, 2020

(51) Int. Cl.
*G06F 3/06* (2006.01)
(52) U.S. Cl.
CPC .......... *G06F 3/0631* (2013.01); *G06F 3/0604* (2013.01); *G06F 3/0679* (2013.01)
(58) Field of Classification Search
CPC .................................................... G06F 3/0604
See application file for complete search history.

(56) References Cited

U.S. PATENT DOCUMENTS

| 2013/0346366 | A1* | 12/2013 | Ananthanarayanan | G06F 16/273 707/611 |
| 2016/0357743 | A1* | 12/2016 | Swaminathan | G06F 16/2255 |
| 2018/0143850 | A1* | 5/2018 | Avni | G06F 11/1474 |

\* cited by examiner

*Primary Examiner* — David Yi
*Assistant Examiner* — Nicholas A. Paperno
(74) *Attorney, Agent, or Firm* — Anderson Gorecki LLP (57) ABSTRACT

Protection and recovery is provided for an allocation unit of data that is in-flight between a source device and a target device of a storage system during a systemic failure by selecting between corresponding source device and target device metadata based on consistency and reciprocal linkage. If logical volume metadata for the allocation unit of the data in volatile memory is not consistent with logical volume metadata for the allocation unit in non-volatile storage, then the allocation unit is recovered from the source device. If target device metadata for the data in volatile memory is not consistent with target device metadata for the data in non-volatile storage, then the allocation unit is recovered from the source device. If linkage between logical volume metadata for the allocation unit and target device metadata for the data is not reciprocal, then the allocation unit is recovered from the source device. If none of those conditions are satisfied, then the allocation unit is recovered from the target device.

20 Claims, 10 Drawing Sheets

EFFICIENT RESILIENCE IN A METADATA PAGING ARRAY FOR IN-FLIGHT USER DATA

TECHNICAL FIELD

The subject matter of this disclosure is generally related to data storage systems and more particularly to protection and recovery of data that is in-flight during a systemic failure.

BACKGROUND

Data storage systems such as storage area networks (SANs) are used to maintain large data sets and contemporaneously support many users. SANs provide host servers with block-based access to data that is used by applications that run on the host servers. A storage array, which is one implementation of a SAN, includes a network of computing nodes that manage access to arrays of drives such as solid-state drives (SSDs) and hard disk drives (HDDs) using interconnecting fabrics rather than switches for communication. Although a primary function of the storage array may be to respond to input-output (IO) commands from host servers to read and write data, various secondary functions require data to be relocated between managed drives. For example, data may be moved between managed drives of different performance levels pursuant to storage tiering that relocates data to higher or lower performing drives based on access frequency. Load balancing and compression are other examples of functions that typically require data to be moved between managed drives.

A variety of features are used to maintain data integrity and data availability while protecting against data loss. Standby power such as batteries allow data to be moved from volatile memory to non-volatile storage when primary power fails, and archival copies, snaps, RAID, and other features enable rebuilding of failed drives and disaster recovery. However, problems may still occur. For example, standby power systems may fail or have inadequate power to enable all in-flight data to be moved to non-volatile storage in response to a systemic failure. Journaling may be performed to protect against loss of data that is in-flight (being relocated between drives) when a systemic failure occurs. Journals include logs and metadata that are written to a dedicated portion of the managed drives. When data is relocated within a SAN, new metadata is created to indicate linkage between a logical volume and the new location to which the data is being moved. Metadata associated with a first copy of data on a source device and metadata associated with a second copy of the data being copied to a destination device may both be journaled for disaster recovery purposes. Logs of data movement initiation and completion may also be journaled. However, journaling for protection against loss of in-flight data has drawbacks such as latency and write-wear associated with multiple writes to SSDs for each move.

SUMMARY

All examples, aspects and features mentioned in this document can be combined in any technically possible way.

A method in accordance with some implementations of the invention may comprise: in a storage system in which an allocation unit of data of a logical volume is being moved from a source device to a target device when a failure occurs, recovering the data by: determining that logical volume metadata for the allocation unit in volatile memory is consistent with logical volume metadata for the allocation unit in non-volatile storage; determining that target device metadata for the data in volatile memory is consistent with target device metadata for the data in non-volatile storage; determining that linkage between logical volume metadata for the allocation unit and target device metadata for the data is reciprocal; and recovering the data from the target device. Some implementations also comprise recovering the data from the source device in response to determining that logical volume metadata for the allocation unit in volatile memory is inconsistent with logical volume metadata for the allocation unit in non-volatile storage. Some implementations also comprise recovering the data from the source device in response to determining that target device metadata for the data in volatile memory is inconsistent with target device metadata for the data in non-volatile storage. Some implementations also comprise recovering the data from the source device in response to determining that reciprocal linkage between logical volume metadata for the allocation unit and target device metadata for the data is lacking. Some implementations also comprise updating the logical volume metadata for the allocation unit in volatile memory to indicate that the allocation unit is being moved from the source device to the target device. Some implementations also comprise lazily updating the logical volume metadata for the allocation unit in non-volatile storage to indicate that the allocation unit is being moved from the source device to the target device. Some implementations also comprise updating the target device metadata for the data in volatile memory to indicate that corresponding target device data is associated with the allocation unit of the logical volume. Some implementations also comprise lazily updating the target device metadata for the data in non-volatile storage to indicate that corresponding target device data is associated with the allocation unit of the logical volume.

An apparatus in accordance with some implementations of the invention may comprise: a plurality of managed drives; a plurality of interconnected computing nodes that manage access to the managed drives and present a logical volume to a host; and a relocator responsive to movement of an allocation unit of data of the logical volume from a source device to a target device when a failure occurs to that logical volume metadata for the allocation unit in volatile memory is consistent with logical volume metadata for the allocation unit in non-volatile storage, determine that target device metadata for the data in volatile memory is consistent with target device metadata for the data in non-volatile storage, determine that linkage between logical volume metadata for the allocation unit and target device metadata for the data is reciprocal, and recover the data from the target device. In some implementations the relocator recovers the data from the source device responsive to a determination that logical volume metadata for the allocation unit in volatile memory is inconsistent with logical volume metadata for the allocation unit in non-volatile storage. In some implementations the relocator recovers the data from the source device responsive to a determination that target device metadata for the data in volatile memory is inconsistent with target device metadata for the data in non-volatile storage. In some implementations the relocator recovers the data from the source device responsive to a determination that reciprocal linkage between logical volume metadata for the allocation unit and target device metadata for the data is lacking. In some implementations the relocator updates the logical volume metadata for the allocation unit in volatile memory to indicate that the allocation unit is being moved from the source device to the target device. In some implementations the relocator lazily updates the logical volume metadata for the allocation unit in non-volatile storage to indicate that the allocation unit is being moved from the source device to the target device. In some implementations the relocator updates the target device metadata for the data in volatile memory to indicate that corresponding target device data is associated with the allocation unit of the logical volume. In some implementations the relocator lazily updates the target device metadata for the data in non-volatile storage to indicate that corresponding target device data is associated with the allocation unit of the logical volume.

Some implementations comprise a computer-readable storage medium storing instructions that when executed by a computer cause the computer to perform a method for using a computer system to recover data that is in-flight during a failure, the method comprising: in a storage system in which an allocation unit of data of a logical volume is being moved from a source device to a target device when a failure occurs, recovering the data by: determining that logical volume metadata for the allocation unit in volatile memory is consistent with logical volume metadata for the allocation unit in non-volatile storage; determining that target device metadata for the data in volatile memory is consistent with target device metadata for the data in non-volatile storage; determining that linkage between logical volume metadata for the allocation unit and target device metadata for the data is reciprocal; and recovering the data from the target device. Some implementations comprise recovering the data from the source device in response to determining that logical volume metadata for the allocation unit in volatile memory is inconsistent with logical volume metadata for the allocation unit in non-volatile storage. Some implementations comprise recovering the data from the source device in response to determining that target device metadata for the data in volatile memory is inconsistent with target device metadata for the data in non-volatile storage. Some implementations comprise recovering the data from the source device in response to determining that reciprocal linkage between logical volume metadata for the allocation unit and target device metadata for the data is lacking.

Other aspects, features, and implementations may become apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to one or more of special purpose physical circuit elements, firmware, software, and computer instructions that are stored on a non-transitory computer-readable medium and implemented by multi-purpose tangible processors.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
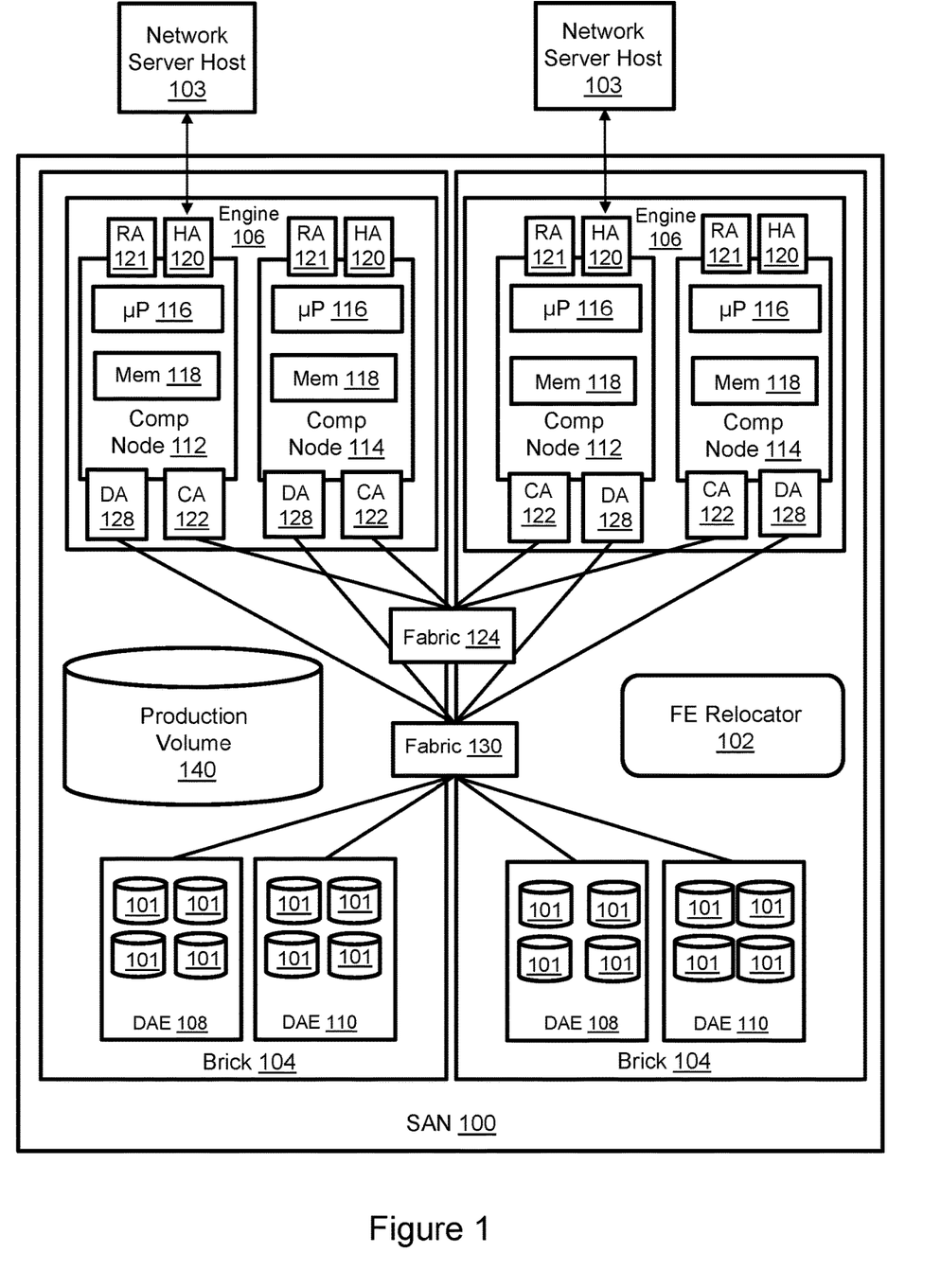
FIG. 1 illustrates a SAN with a front-end (FE) relocator for protection and recovery of in-flight data.

FIG. 1 illustrates a SAN 100 (specifically, a storage array) with a front-end (FE) relocator 102. As will be explained in greater detail below, the FE relocator manages protection and recovery of data that is in-flight during a systemic failure. The SAN is depicted in a simplified data center environment that includes two network servers 103, which may be referred to as "hosts." The network servers include volatile memory, non-volatile storage, one or more tangible processors, and a hypervisor or containers. Instances of applications (host applications) running on each network server use data that is maintained by the SAN. Examples of host applications may include email programs, inventory control programs, and accounting programs, for example and without limitation.

The SAN 100 includes one or more bricks 104. Each brick includes an engine 106 and one or more drive array enclosures (DAEs) 108, 110. Each DAE includes managed drives 101 that are non-volatile storage media such as, without limitation, solid-state drives (SSDs) based on EEPROM technology such as NAND and NOR flash memory and hard disk drives (HDDs) with spinning disk storage media. Drive controllers may be associated with the managed drives as is known in the art. Each engine 106 includes a pair of interconnected computing nodes 112, 114, which may be referred to as "storage directors." Although some of those skilled in the art may refer to the computing nodes as "hosts," that naming convention is avoided in this disclosure to distinguish the network servers 103 from the computing nodes 112, 114. Nevertheless, the host applications could run on the computing nodes, e.g. on virtual machines or in containers. Each computing node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each computing node includes one or more host adapters (HAs)

120 for communicating with the hosts 103. Each host adapter has resources for servicing input-output commands (IOs) from the hosts. The resources may include processors, volatile memory, and ports via which the hosts may access the SAN. Each computing node also includes a remote adapter (RA) 121 for communicating with other storage systems. Each computing node also includes one or more drive adapters (DAs) 128 for communicating with the managed drives 101 in the DAEs 108, 110. Each drive adapter has processors, volatile memory, and ports via which the computing node may access the DAEs for servicing IOs. Each computing node may also include one or more channel adapters (CAs) 122 for communicating with other computing nodes via an interconnecting fabric 124. The paired computing nodes 112, 114 of each engine 106 provide failover protection and may be directly interconnected by communication links. An interconnecting fabric 130 enables implementation of an N-way active-active backend. A backend connection group includes all drive adapters that can access the same drive or drives. In some implementations every drive adapter 128 in the SAN can reach every DAE via the fabric 130. Further, in some implementations every drive adapter in the SAN can access every managed drive 101 in the SAN.

Data associated with the hosted application instances running on the hosts 103 is maintained on the managed drives 101. The managed drives 101 are not discoverable by the hosts 103 but the SAN 100 creates a production volume 140 that can be discovered and accessed by the hosts. The production volume is a logical storage device that may be referred to as a source device, production device, or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101. Due to the above-described configuration the SAN is unaware of higher-level structures such as files. Filesystems may be maintained by the hosts.

Metadata that maps between the production volume LBAs and addresses in the shared memory and the managed drives is maintained by the computing nodes. For performance reasons it has been standard practice in the art to design storage systems that maintain all such metadata in low-latency volatile memory. For example, each computing node may dedicate a portion or partition of its respective local memory to a logical shared memory that contains the metadata and can be accessed by other computing nodes, e.g. via direct memory access (DMA) or remote DMA (RDMA). However, the amount of volatile memory required to contemporaneously accommodate all metadata can become prohibitively costly as the average size of the data sets stored on SANs continues to increase. Metadata paging is a technique that helps to reduce the amount of volatile memory used for metadata. In storage systems that implement metadata paging the metadata is maintained in less costly non-volatile storage (e.g., the managed drives 101) and copied into (paged-in to) volatile memory (e.g. the shared memory) in fixed-size pages as needed. The portion of memory dedicated for maintaining metadata may be fixed in size and pages are evicted from memory as free space is required to page-in other metadata. Thus, only a portion of all metadata resides in memory at any given time.

The illustrated SAN 100 implements metadata paging. The computing nodes 112, 114 use hash tables to obtain page numbers of pages associated with requested data in response to IO commands sent by the hosts 103, e.g. to read data from or write data to the production volume 140. The page numbers are used to find the corresponding pages of metadata in a first portion of the shared memory. Track IDs (TIDs) in those pages are used to find and obtain the corresponding data in a second portion of the shared memory. However, the pages indicated by the page number are not necessarily located in the shared memory when the IO is received. If the pages are "out" of the shared memory then the pages are paged-in to shared memory from non-volatile storage and used to locate the corresponding data, which is then copied from the managed drives into the shared memory to service the IO.

Regardless of whether metadata paging is implemented by a storage system, metadata that is created or changed because of relocation of data is "lazily" copied to non-volatile storage, i.e. copied based on availability of resources that are not used for more important tasks. Lazy copying may be implemented for performance and longevity reasons. For example, resource requirements for processing IOs may be prioritized over resource requirements for creating persistent copies of metadata records that exist only in the shared memory so that performance in terms of IOPS is not degraded by copying metadata to non-volatile storage for data relocation. Further, reducing write frequency reduces wear on SSDs. As a result, updated metadata for in-flight data may or may not be present in non-volatile storage when a systemic failure occurs.

Figure 2:
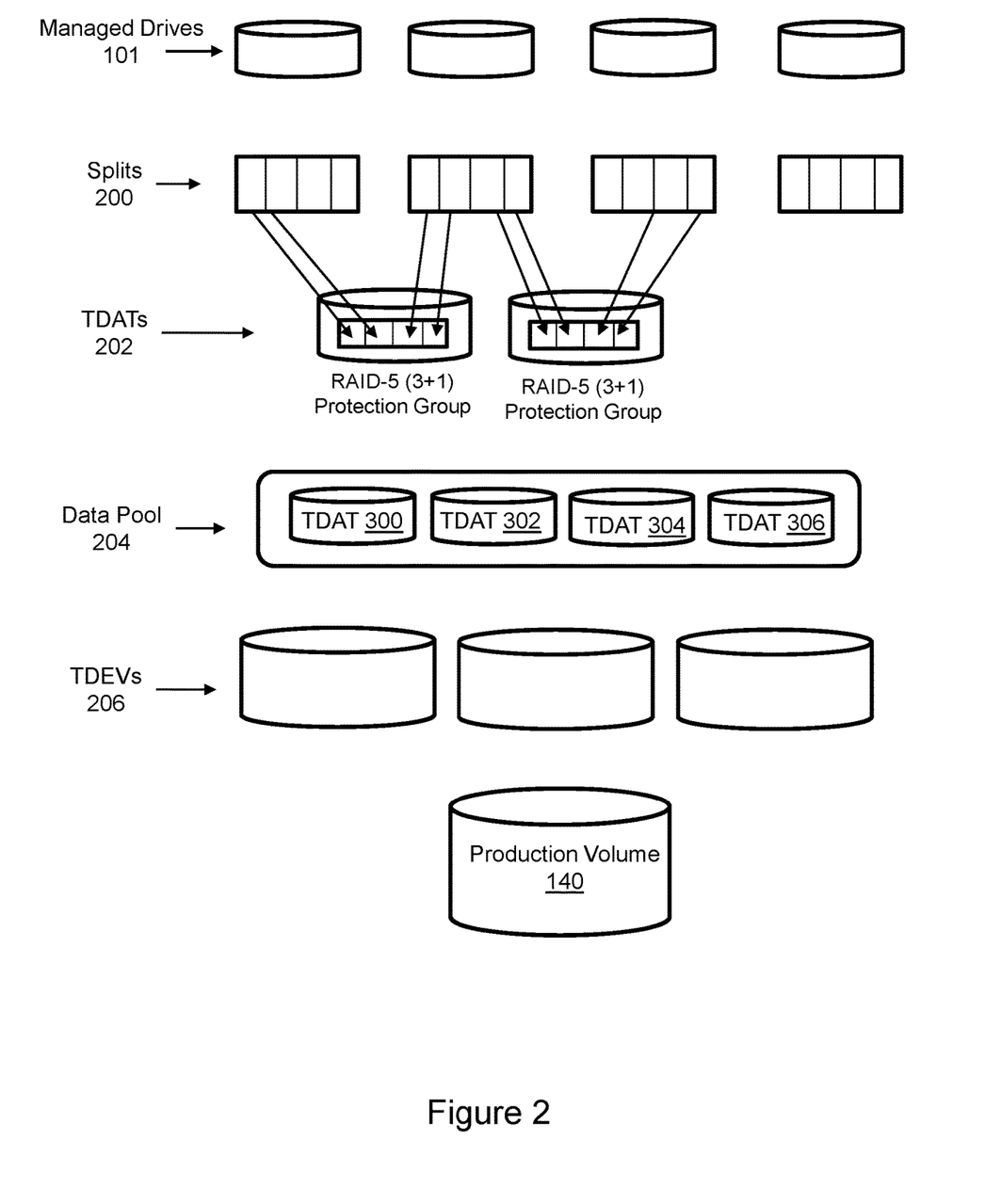
FIG. 2 illustrates various layers of abstraction between the managed drives and the production volume.

FIG. 2 illustrates various layers of abstraction between the managed drives 101 and the production volume 140. The managed drives 101 are each organized as a plurality of logical splits 200 of equal capacity. Each split includes a contiguous range of logical addresses such as LBAs. The storage capacity of a single split is a design implementation and, for context and without limitation, may be some fraction or percentage of the capacity of a managed drive equal to an integer multiple of sectors greater than 1. A sector may be the smallest unit of storage that a managed drive processes so a sector may be provided in response to a sub-sector-sized read and a sector may be overwritten in response to a sub-sector-sized write. The size of 1 sector is an implementation detail but may be, for example and without limitation, 8192 bytes. Groups of splits from multiple managed drives are used to create data devices (TDATs) 202. More particularly, the splits on each TDAT are organized as members of a RAID protection group. RAID-5 (3+1) protection groups are shown in the illustrated example. A data pool 204, also known as a "thin pool," is a collection of TDATs 202 of the same emulation and RAID protection type. In some implementations all TDATs in a drive group are of a single RAID protection type and all are the same size (capacity). Logical thin devices (TDEVs) 206 are created with the TDATs. The production volume 140 is created from TDEVs 206.

Figure 3:
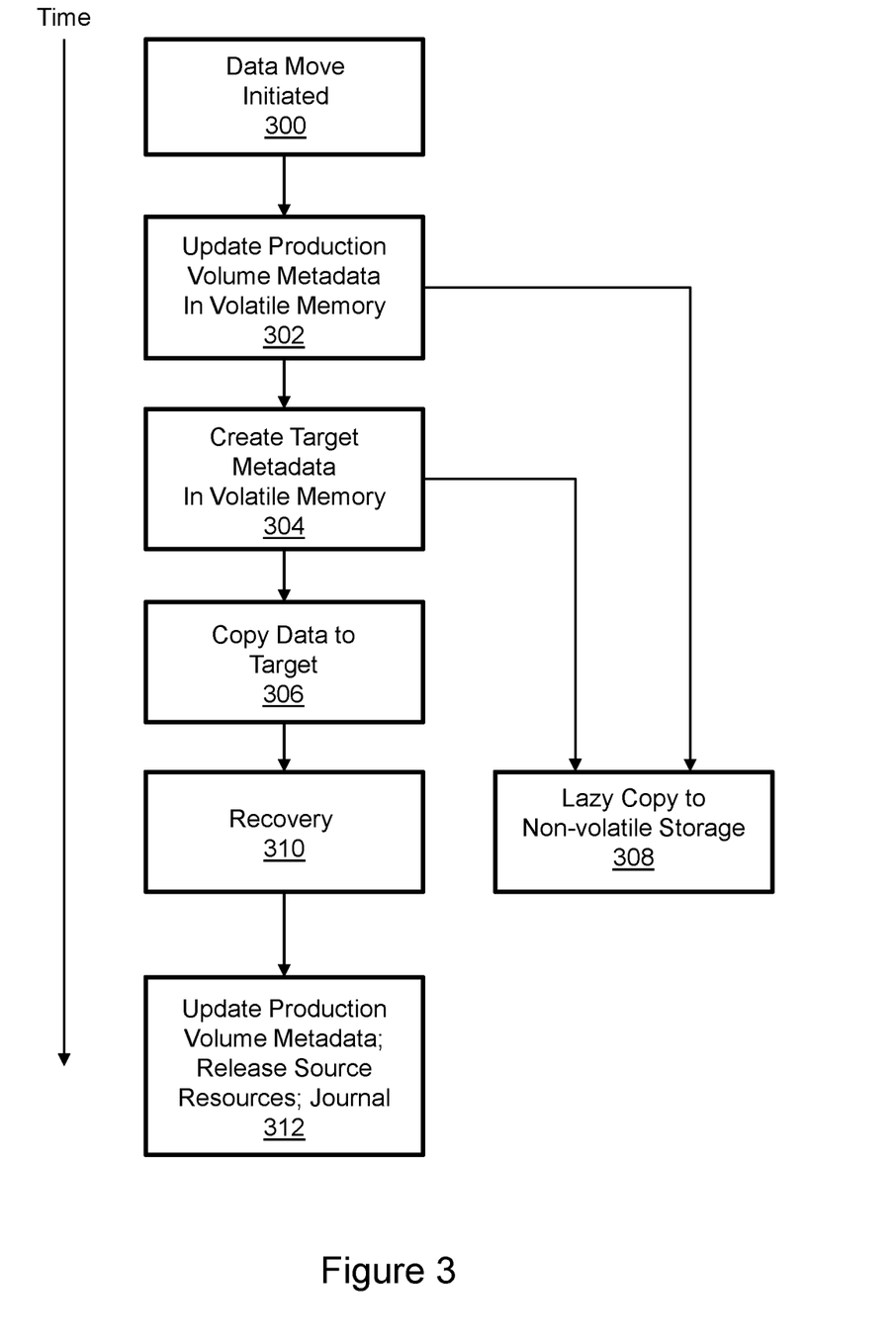
FIG. 3 illustrates data movement between managed drives and recovery of in-flight data.

FIG. 3 illustrates data relocation between managed drives of the SAN and recovery of in-flight data. The steps are not necessarily performed in the illustrated order, but certain temporal dependencies exist as will be explained below. The process begins when a data move is initiated as indicated in step 300. The amount of data being moved is not critical but in general movement may be implemented in same-sized allocation units for which individual metadata records are maintained. For purposes of explanation the allocation units are "tracks" and movement of a track-C from a source device (TDAT-A) to a target device (TDAT-B) will be described. However, the source and target are not necessarily TDATs and an allocation unit other than a track could be used. The target device may be referred to as the "primary" and the source device may be referred to as the "secondary."

Figure 4:
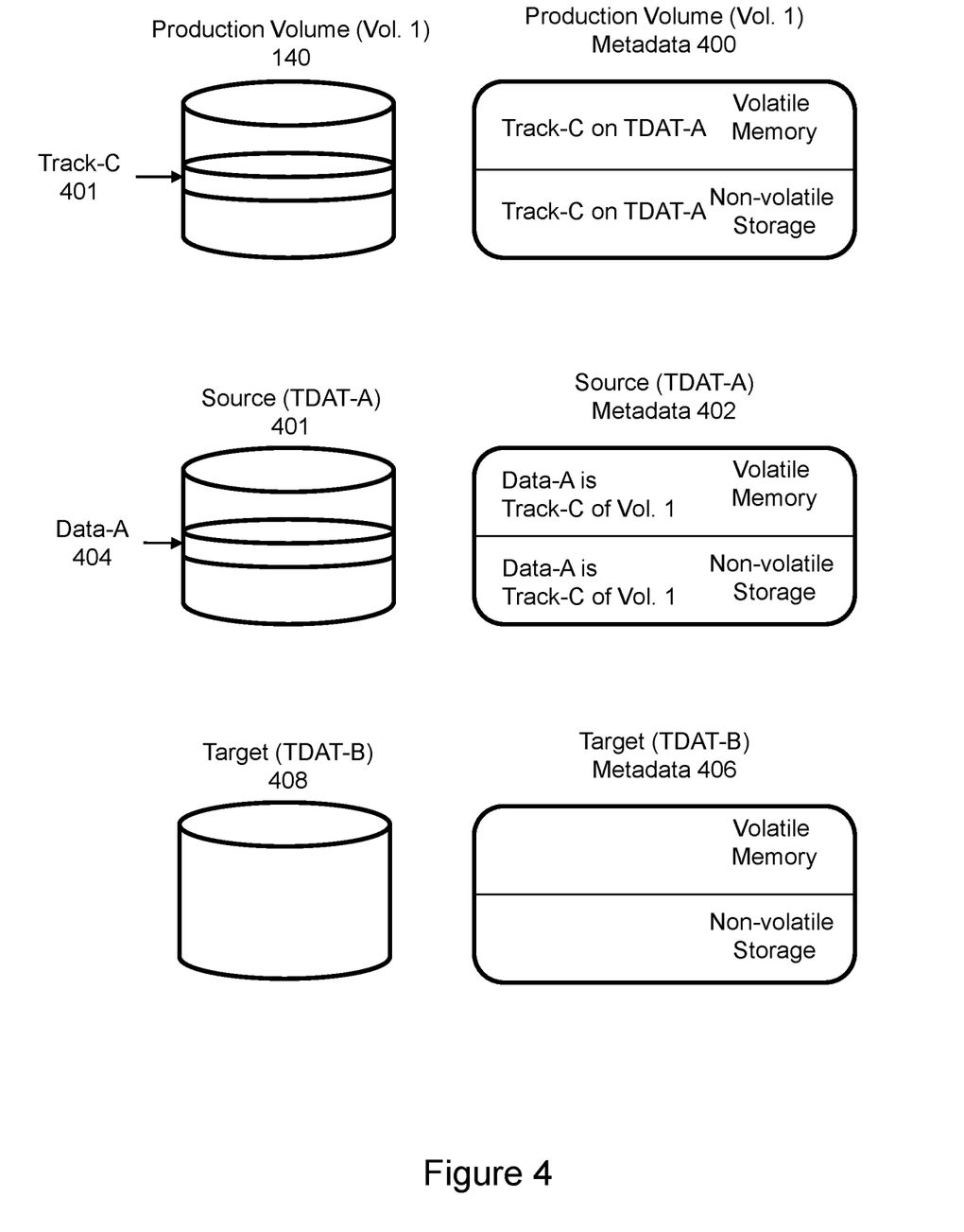
FIGS. 4, 5, 6, 7, 8, and 9 illustrate various metadata states that may occur before, during, and after data movement between managed drives.

The state of the metadata associated with track-C when the move is initiated (step 300, FIG. 3) is shown in FIG. 4. Track-C 401 resides at known LBAs of the production volume (Vol. 1) 140 and production volume metadata 400 indicates that Track-C resides on the source device (TDAT-A) 401. The production volume metadata 400 for Track-C in volatile memory and non-volatile storage is consistent because both indicate that Track-C resides on the source device (TDAT-A) 401. Source (TDAT-A) metadata 402 reciprocally indicates that data-A 404, which is the data associated with track-C, resides at addresses indicated by the metadata, e.g. pointers indicate that data-A is track-C of Vol. 1. Target (TDAT-B) metadata 406 does not contain metadata associated with track-C. Further, track-C data is not present on the target device (TDAT-B) 408 because creation of corresponding target (TDAT-B) metadata is a prerequisite for copying the data to the target device (TDAT-B).

Referring again to FIG. 3, the production volume metadata for track-C in volatile memory is updated in preparation for the move as indicated in step 302. Similarly, target (TDAT-B) metadata associated with track-C is created as indicated in step 304. The data (data-A) is then copied to the target device (TDAT-B), thereby creating data-B, as indicated in step 306. Steps 302 and 304 may be performed contemporaneously or in any order, but steps 302 and 304 are completed before the data is copied to the target device (TDAT-B). The production volume metadata for track-C in volatile memory and the target (TDAT-B) metadata for track-C in volatile memory are each lazily copied to non-volatile storage as indicated in step 308. Creation of the production volume metadata and target (TDAT-B) metadata copies in non-volatile storage may be contemporaneous or in any order. When the movement of the data is completed the production volume metadata for track-C may be updated again, e.g. to point only to the target device (TDAT-B), the source (TDAT-A) resources holding metadata and data may be released, and the move journaled as indicated in step 312. However, a recovery step 310 may occur before the move is completed. Because the recovery step 310 may occur before, during, or after completion of the lazy copy to non-volatile storage of step 308, execution of the recovery step is dependent on the state of the lazy copying step when the systemic failure occurs.

FIGS. 4, 5, 6, 7, 8, and 9 illustrate various possible states of metadata and data copying, creation, and update that may exist for in-flight data when the recovery step begins. The numbering of the figures does not necessarily correspond to a progression of states. As shown in FIG. 4, no updates to the production volume metadata 400 and target (TDAT-B) metadata 406 may have been made and data-A 404 may not have been copied from the source device (TDAT-A) to the target device (TDAT-B). Consequently, the production volume metadata 400 indicates that track-C 401 is on the source (TDAT-A).

Figure 5:
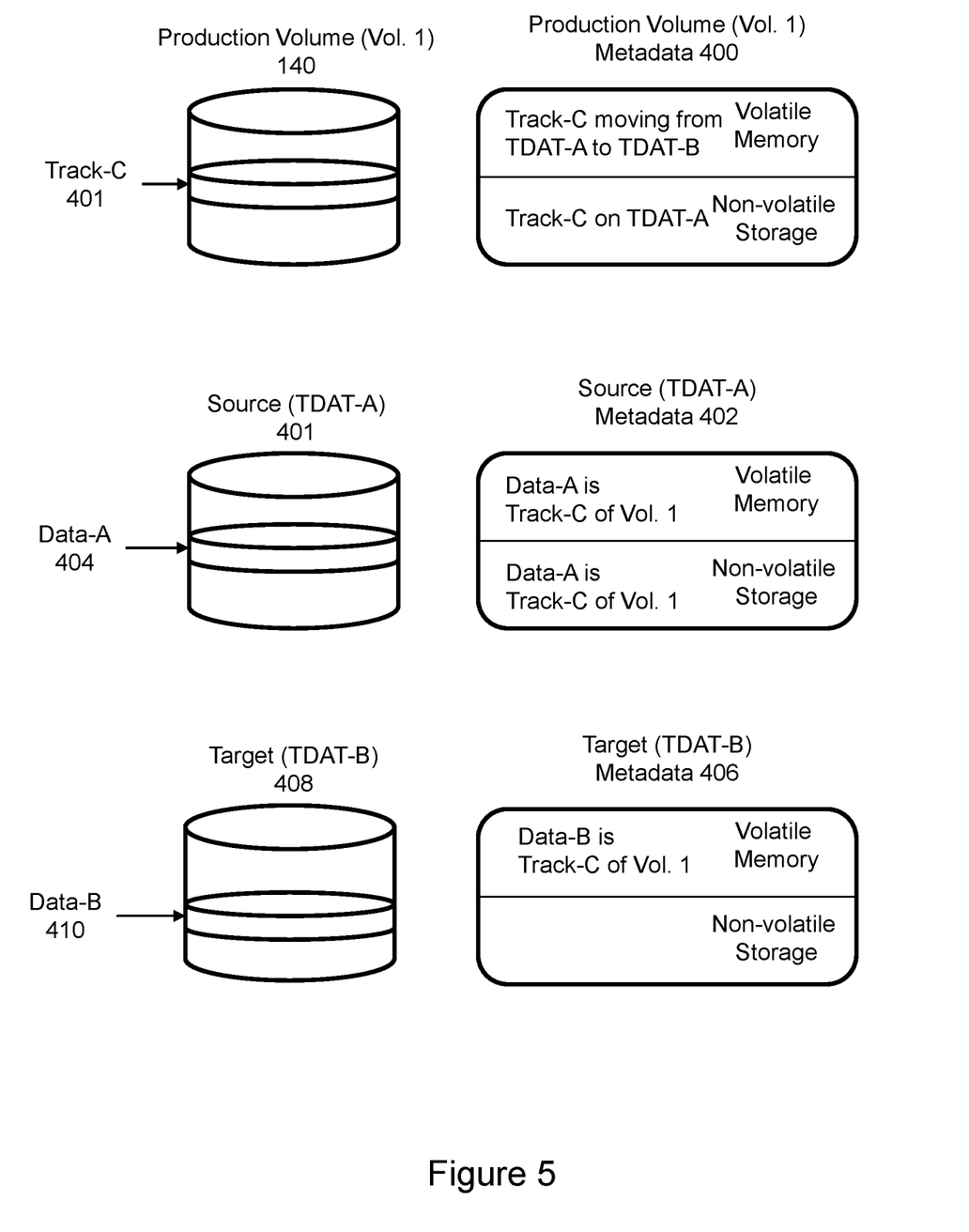

As shown in FIG. 5, the production volume metadata 400 for track-C in volatile memory may have been updated to indicate that track-C is moving from the source device (TDAT-A) to the target device (TDAT-B). However, the lazy copying to non-volatile storage may be incomplete for the production volume metadata 400 so the production volume metadata in non-volatile storage may still indicate that track-C is on the source device (TDAT-A). The target (TDAT-B) metadata 406 in volatile memory may have been created to indicate that data-B 410 is track-C of the production volume 140. However, the lazy copying to non-volatile storage may be incomplete for the target (TDAT-B) metadata 406 so no corresponding entry exists in non-volatile storage. Although data-B is shown on the target device (TDAT-B), it is possible that data-A has not yet been copied from the source device (TDAT-A) to the target device (TDAT-B) so data-B may be less than a complete copy of data-A.

Figure 6:
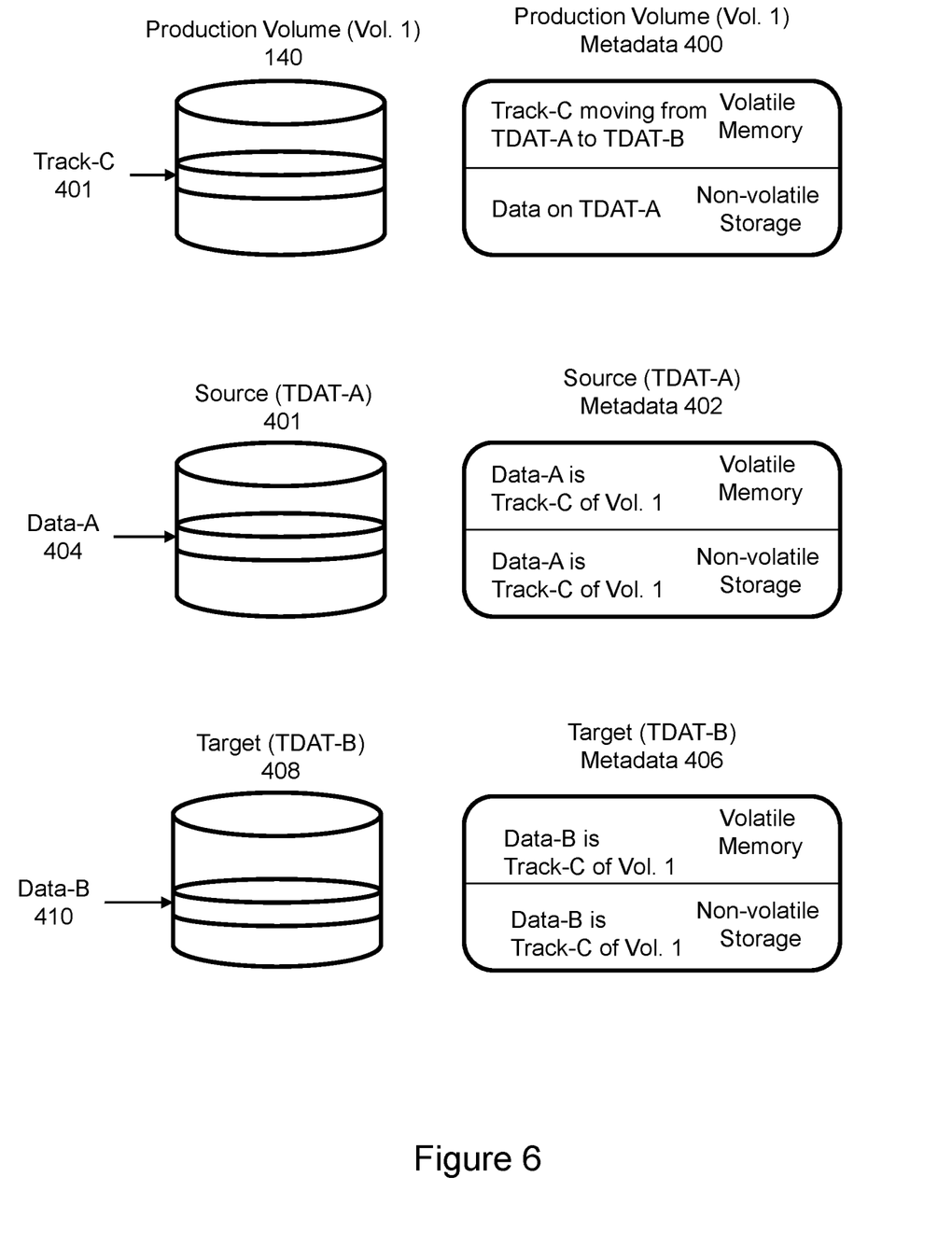

As shown in FIG. 6, the production volume metadata 400 for track-C in volatile memory may have been updated to indicate that track-C is moving from the source device (TDAT-A) to the target device (TDAT-B). However, the lazy copying to non-volatile storage may be incomplete for the production volume metadata 400 so the production volume metadata in non-volatile storage may still indicate that track-C is on the source device (TDAT-A). The target (TDAT-B) metadata 406 for track-C in volatile memory and non-volatile storage may have been created to indicate that data-B is track-C of the production volume (Vol. 1), i.e. the lazy copying to non-volatile storage may be complete for the target (TDAT-B) metadata 406. It is possible, although not certain, that data-B is less than a complete copy of data-A.

Figure 7:
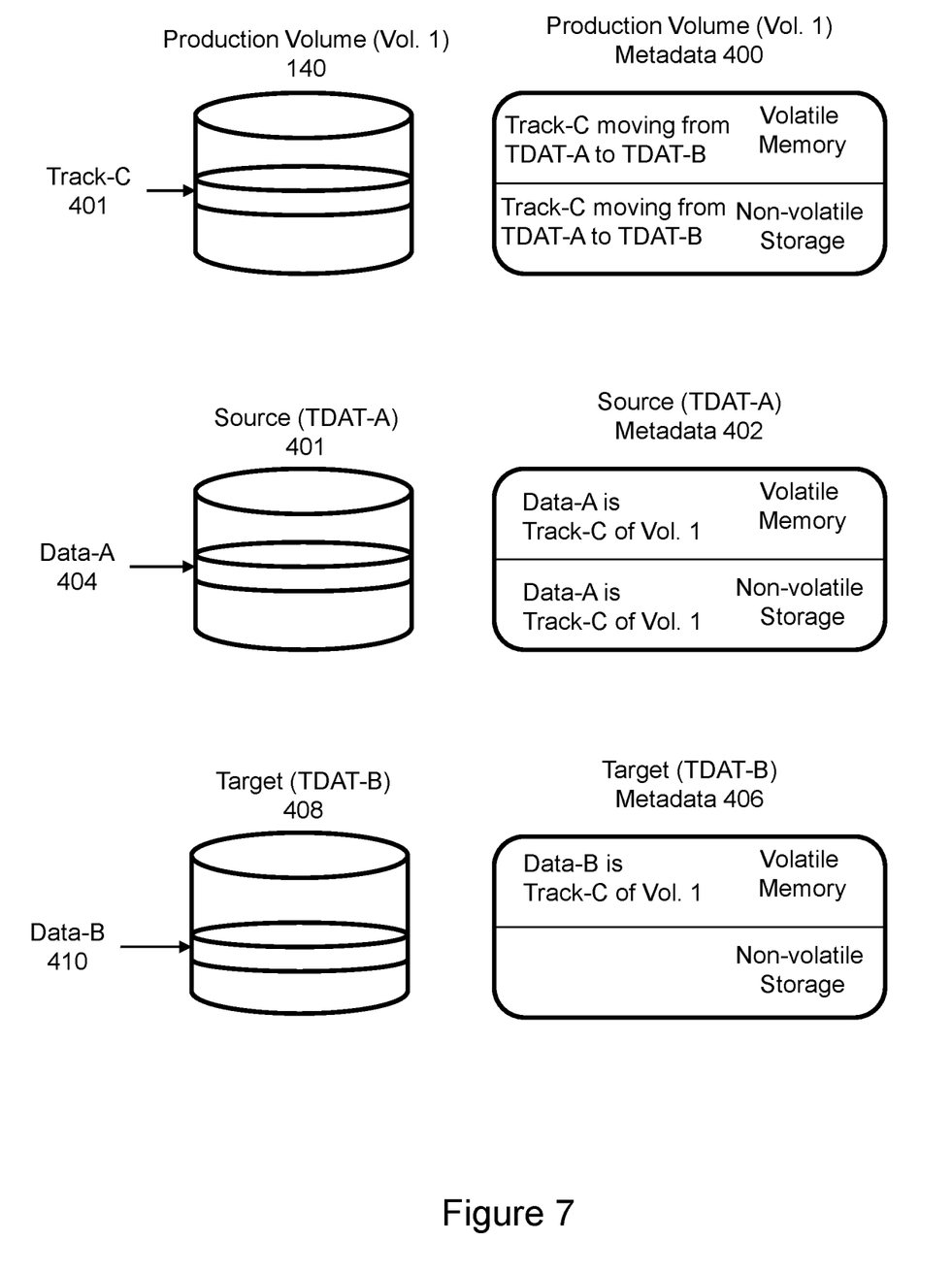

As shown in FIG. 7, the production volume metadata 400 for track-C in volatile memory and non-volatile storage may have been updated to indicate that track-C is moving from the source device (TDAT-A) to the target device (TDAT-B), i.e. lazy copying to non-volatile storage may be complete for the production volume metadata 400. Further, the target (TDAT-B) metadata 406 for track-C in volatile memory may have been created to indicate that data-B is track-C of Vol. 1. However, the lazy copying to non-volatile storage may be incomplete for the target (TDAT-B) metadata 406 so no corresponding target (TDAT-B) metadata entry exists in nonvolatile storage. Data-A may or may not have been fully copied from the source device (TDAT-A) to the target device (TDAT-B).

Figure 8:
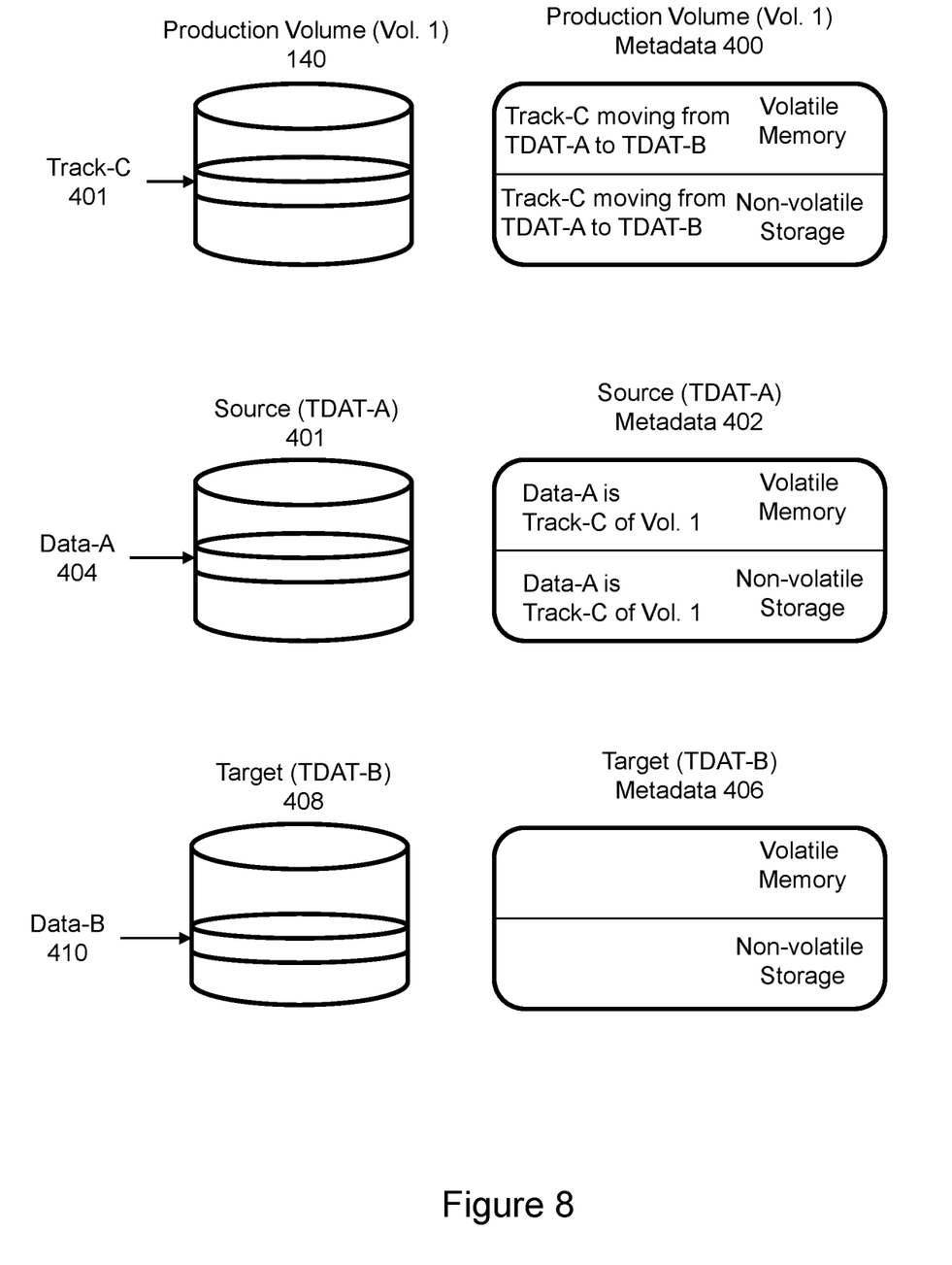

As shown in FIG. 8, the production volume metadata 400 for track-C in volatile memory and non-volatile storage may have been updated to indicate that track-C is moving from the source device (TDAT-A) to the target device (TDAT-B), i.e. lazy copying to non-volatile storage may be complete for the production volume metadata 400. However, the target (TDAT-B) metadata 406 for track-C may not yet have been created in either volatile memory or non-volatile storage to indicate that data-B is track-C of Vol. 1. Consequently, reciprocal linkage between the target (TDAT-B) metadata 406 and the production volume metadata 400 does not exist.

Figure 9:
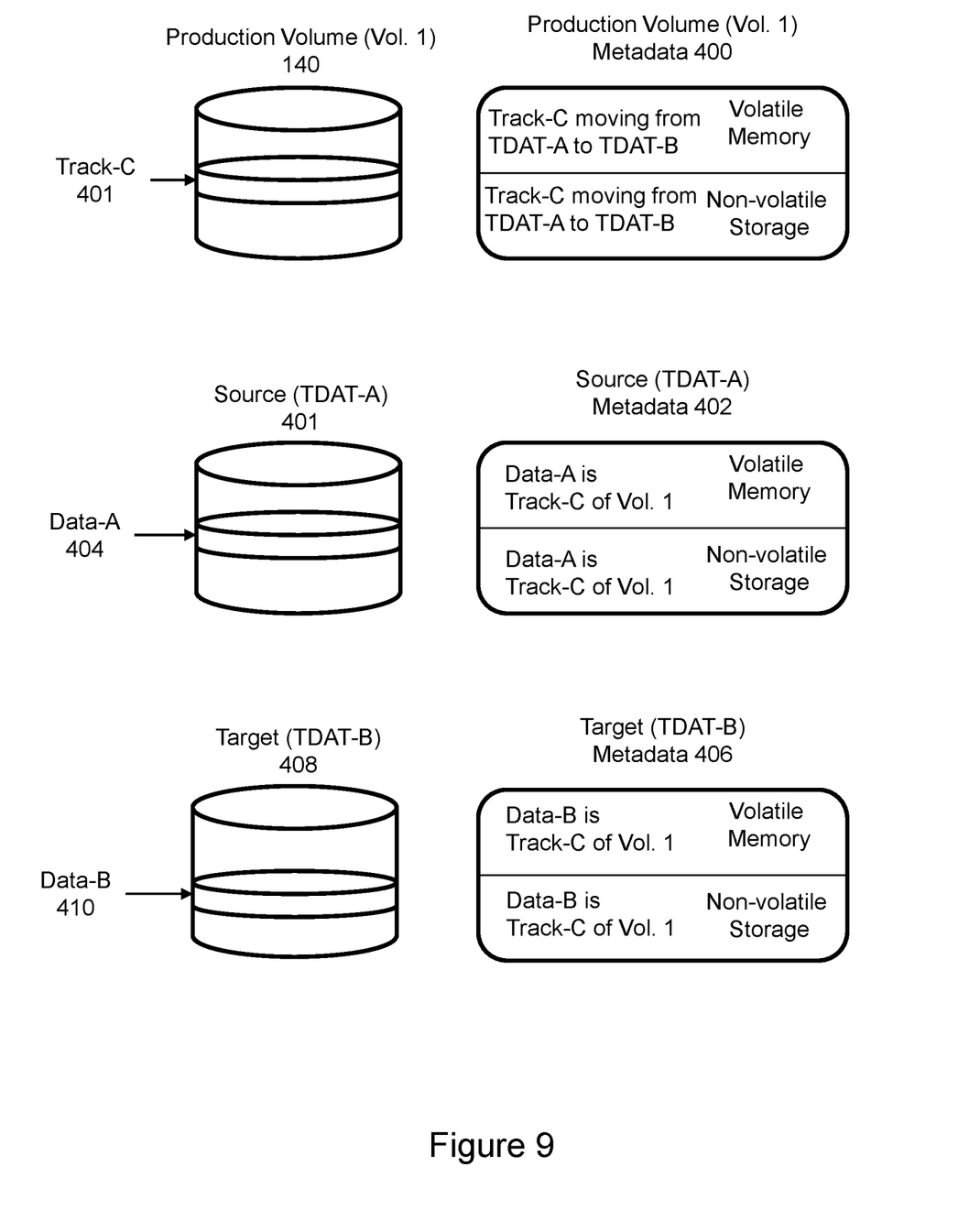

As shown in FIG. 9, the production volume metadata 400 for track-C in volatile memory and non-volatile storage may have been updated to indicate that track-C is moving from the source device (TDAT-A) to the target device (TDAT-B), i.e. lazy copying to non-volatile storage may be complete for the production volume metadata 400. Further, the target (TDAT-B) metadata 406 for track-C in volatile memory and non-volatile storage may have been created to indicate that data-B is track-C of Vol. 1, i.e. lazy copying to non-volatile storage may be complete for the target (TDAT-B) metadata 406. Consequently, data-A 404 has been copied from the source device (TDAT-A) to the target device (TDAT-B) and data-B is a complete copy of data-A.

Figure 10:
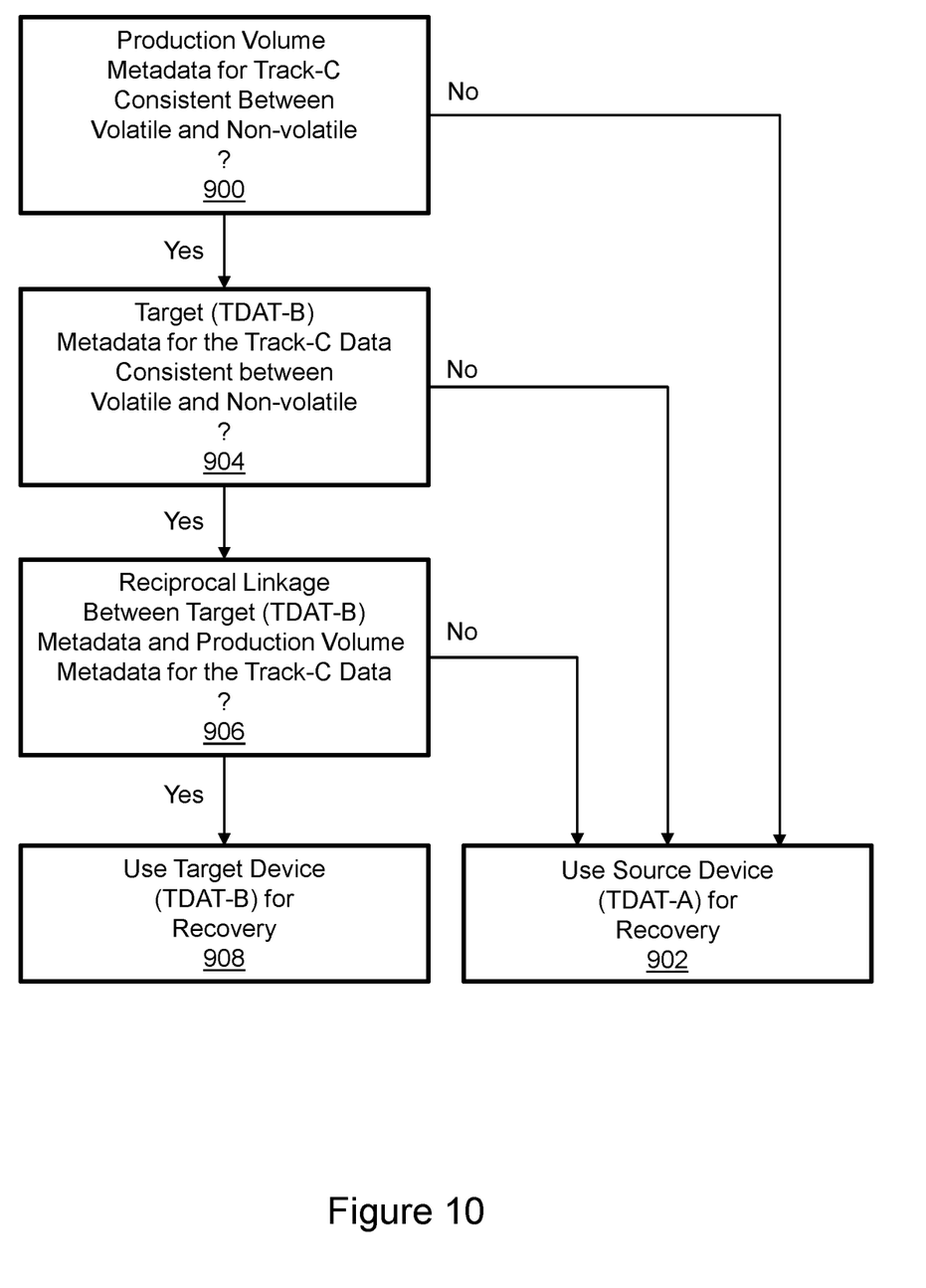
FIG. 10 illustrates the in-flight data recovery operation of FIG. 3 in greater detail.

FIG. 10 illustrates the in-flight data recovery operation 310 of FIG. 3 in greater detail. Step 900 is determining whether the production volume metadata for track-C is consistent. Production volume metadata consistency is indicated by the presence of consistent copies of the production volume metadata for track-C in both volatile memory and non-volatile storage, which occurs when the lazy copying is completed. If production volume metadata consistency is not indicated, e.g. as in FIG. 6, then the source device (TDAT-B) is used for recovery as indicated in step 902, i.e. data-A is regarded as the valid copy. If production volume metadata consistency is indicated in step 900, e.g. as in FIG. 7, then step 904 is determining whether the target (TDAT-B) metadata for the track-C data is consistent. Target metadata consistency is indicated by the presence of consistent copies of the metadata for data-B in both volatile memory and non-volatile storage, which occurs when the lazy copying is completed. If target metadata consistency is not indicated, e.g. as in FIG. 7, then the source device (TDAT-B) is used for recovery as indicated in step 902. If target metadata consistency is indicated in step 904, e.g. as in FIG. 6, then step 906 is determining whether there is reciprocal linkage between the target (TDAT-B) metadata and the production volume metadata. Reciprocity is indicated by the production volume (Vol. 1) metadata pointing to the target device (TDAT-B) and the target (TDAT-B) metadata pointing to track-C of the production volume (Vol. 1). If reciprocity is not found, e.g. as in FIG. 8, then the source device (TDAT-B) is used for recovery as indicated in step 902. If reciprocity is found, e.g. as in FIG. 9, then the target device (TDAT-B) is used for recovery as indicated in step 908.

Although advantages are not to be viewed as limitations of the invention, some implementations improve performance of both data relocation and recovery by reducing reliance on journaling. Data relocation using prior art journaling requires three flash writes with two waiting for write states. Some implementations in accordance with the disclosed invention require only two flash writes with one wait state, which is up to twice as fast with ⅓ less wear.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   in a storage system in which an allocation unit of data of a logical volume is being moved from a source device to a target device when a failure occurs, recovering the data by:
   determining that logical volume metadata for the allocation unit in volatile memory is consistent with logical volume metadata for the allocation unit in non-volatile storage;
   determining that target device metadata for the data in volatile memory is consistent with target device metadata for the data in non-volatile storage;
   determining that linkage between logical volume metadata for the allocation unit and target device metadata for the data is reciprocal; and
   recovering the data from the target device.

2. The method of claim 1 comprising recovering the data from the source device in response to determining that logical volume metadata for the allocation unit in volatile memory is inconsistent with logical volume metadata for the allocation unit in non-volatile storage.

3. The method of claim 1 comprising recovering the data from the source device in response to determining that target device metadata for the data in volatile memory is inconsistent with target device metadata for the data in non-volatile storage.

4. The method of claim 1 comprising recovering the data from the source device in response to determining that reciprocal linkage between logical volume metadata for the allocation unit and target device metadata for the data is lacking.

5. The method of claim 1 comprising updating the logical volume metadata for the allocation unit in volatile memory to indicate that the allocation unit is being moved from the source device to the target device.

6. The method of claim 5 comprising lazily updating the logical volume metadata for the allocation unit in non-volatile storage to indicate that the allocation unit is being moved from the source device to the target device.

7. The method of claim 1 comprising updating the target device metadata for the data in volatile memory to indicate that corresponding target device data is associated with the allocation unit of the logical volume.

8. The method of claim 7 comprising lazily updating the target device metadata for the data in non-volatile storage to indicate that corresponding target device data is associated with the allocation unit of the logical volume.

9. An apparatus comprising:
   a plurality of managed drives;
   a plurality of interconnected computing nodes that manage access to the managed drives and present a logical volume to a host; and
   a relocator, responsive to a failure occurring during movement of an allocation unit of data of the logical volume from a source device to a target device, to: determine that logical volume metadata for the allocation unit in volatile memory is consistent with logical volume metadata for the allocation unit in non-volatile storage, determine that target device metadata for the data in volatile memory is consistent with target device metadata for the data in non-volatile storage, determine that linkage between logical volume metadata for the allocation unit and target device metadata for the data is reciprocal, and recover the data from the target device.

10. The apparatus of claim 9 wherein the relocator recovers the data from the source device responsive to a determination that logical volume metadata for the allocation unit in volatile memory is inconsistent with logical volume metadata for the allocation unit in non-volatile storage.

11. The apparatus of claim 9 wherein the relocator recovers the data from the source device responsive to a determination that target device metadata for the data in volatile memory is inconsistent with target device metadata for the data in non-volatile storage.

12. The apparatus of claim 9 wherein the relocator recovers the data from the source device responsive to a determination that reciprocal linkage between logical volume metadata for the allocation unit and target device metadata for the data is lacking.

13. The apparatus of claim 9 wherein the relocator updates the logical volume metadata for the allocation unit in volatile memory to indicate that the allocation unit is being moved from the source device to the target device.

14. The apparatus of claim 13 wherein the relocator lazily updates the logical volume metadata for the allocation unit in non-volatile storage to indicate that the allocation unit is being moved from the source device to the target device.

15. The apparatus of claim 9 wherein the relocator updates the target device metadata for the data in volatile memory to indicate that corresponding target device data is associated with the allocation unit of the logical volume.

16. The apparatus of claim 15 wherein the relocator lazily updates the target device metadata for the data in non-volatile storage to indicate that corresponding target device data is associated with the allocation unit of the logical volume.

17. A non-transitory computer-readable storage medium storing instructions that when executed by a computer cause the computer to perform a method for using a computer system to recover data that is in-flight during a failure, the method comprising:
  in a storage system in which an allocation unit of data of a logical volume is being moved from a source device to a target device when a failure occurs, recovering the data by:
  determining that logical volume metadata for the allocation unit in volatile memory is consistent with logical volume metadata for the allocation unit in non-volatile storage;
  determining that target device metadata for the data in volatile memory is consistent with target device metadata for the data in non-volatile storage;
  determining that linkage between logical volume metadata for the allocation unit and target device metadata for the data is reciprocal; and
  recovering the data from the target device.

18. The non-transitory computer-readable storage medium of claim 17 wherein the method further comprises recovering the data from the source device in response to determining that logical volume metadata for the allocation unit in volatile memory is inconsistent with logical volume metadata for the allocation unit in non-volatile storage.

19. The non-transitory computer-readable storage medium of claim 18 wherein the method further comprises recovering the data from the source device in response to determining that target device metadata for the data in volatile memory is inconsistent with target device metadata for the data in non-volatile storage.

20. The non-transitory computer-readable storage medium of claim 19 wherein the method further comprises recovering the data from the source device in response to determining that reciprocal linkage between logical volume metadata for the allocation unit and target device metadata for the data is lacking.

* * * * *